Figure 3:
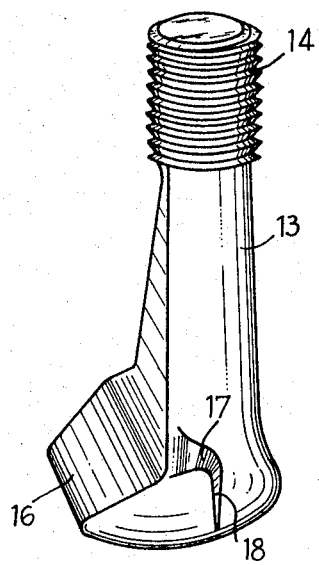

Jan. 17, 1967  J. E. DRIANCOURT  3,298,720
PIPE JOINT
Filed March 22, 1965  2 Sheets-Sheet 1
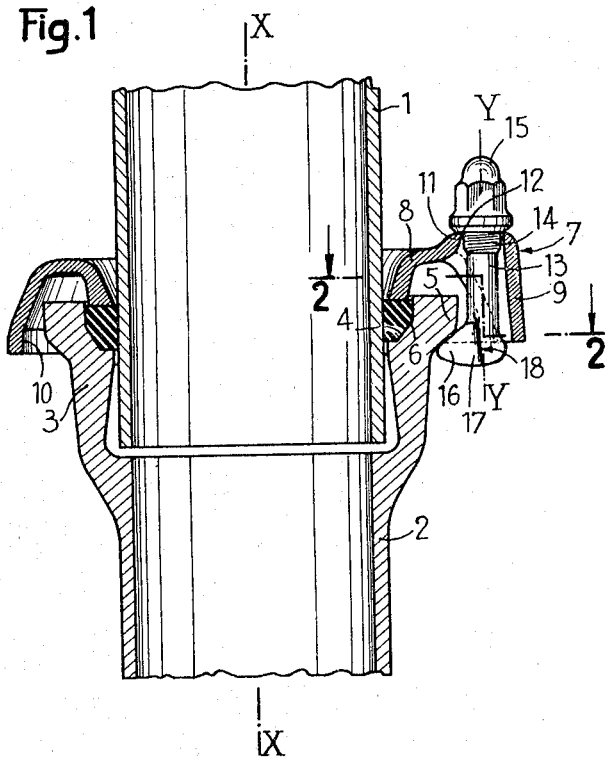
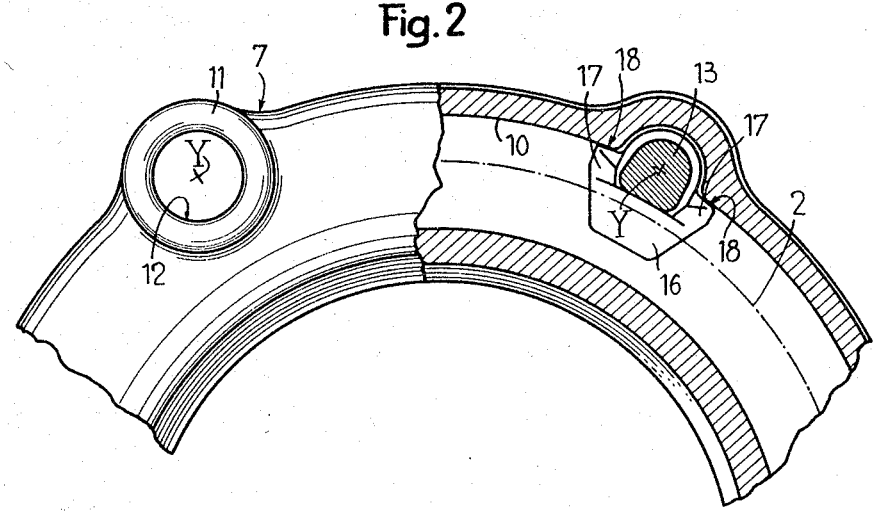
Inventor:
Jean Eugène DRIANCOURT
by J. Delattre-Seguy
Attorney Jan. 17, 1967   J. E. DRIANCOURT   3,298,720
PIPE JOINT Filed March 22, 1965   2 Sheets-Sheet 2

Inventor:
Jean Eugène
   DRIANCOURT
by J. Delattre Seguy
   Attorney

United States Patent Office 3,298,720
Patented Jan. 17, 1967

3,298,720
PIPE JOINT
Jean Eugène Driancourt, Pont-a-Mousson, France, assignor to Centre de Recherches de Pont-a-Mousson, Pont-a-Mousson, France, a French body corporate
Filed Mar. 22, 1965, Ser. No. 441,457
Claims priority, application France, May 14, 1964, 974,477
1 Claim. (Cl. 285—374)

The present invention relates to joints for pipes having a socket of the type in which an elastic sealing element disposed in a recess corresponding to the socket is compressed longitudinally by an annular member, or counter-flange, under the effect of bolts which are equally spaced apart on the circumference of said counter-flange through which they extend, the bolts being hooked to a flange or ring located outside the socket.

Such joints are much appreciated owing to the ease with which they are assembled and also because the sealing of the joint—which mainly depends on the compression of the elastic sealing element—can be easily regulated by means of the tightening force applied to the bolts. Joints of this type have been employed with success for cast iron pipes and their utilization has been extended to spheroidal graphite cast iron pipes owing to the increase in service pressure which this material permits.

However, it is known that spheroidal graphite cast iron shrinks to a different extent to grey cast iron. In respect of spheroidal graphite cast iron the shrinkage moreover varies with the composition of the metal employed, the method of casting and the heat treatment to which the elements are subjected for obtaining the desired mechanical properties. Consequently, in the case of counter-flanges, substantial dimensional differences are observed even when these members have been cast with the same pattern. These differences are even greater when casting with the same pattern counter-flanges of grey cast iron and counterflanges of ductile cast iron. Now, bearing in mind that the bolts bear against the counter-flange, if the diameter of the latter is liable to undergo important variations, the position of the bolts relative to the hooking flange or ring of the socket could vary in an appreciable manner and in some cases the bolts even no longer hook on said flange so that it is impossible to achieve the joint.

The object of the invention is to provide an improved joint for pipe elements, one of which has a male end and the other a socket provided with an external flange, which remedies this serious drawback.

The invention provides a joint having an annular counter-flange having an axis coinciding with the axis of the pipe elements and having a generally U-shape radial section, bosses in spaced relation on the periphery of the counter-flange, apertures in said bosses, the apertures being in spaced relation on a circle centered on said axis of the counter-flange, joint-assembling bolts extending through the apertures, the counter-flange having an outer branch which has part-cylindrical inner surfaces having substantially the same radius as said circle and centered on said axis of the counter-flange, each of the bolts comprising a flange-hooking head and two lateral projections which are located on each side of a hooking nose of the head, said lateral projections having faces substantially contained in a common diametral plane of the bolt, whereby the bolts bear solely by said faces of said two lateral projections on said part-cylindrical surfaces of the outer branch of the counterflange.

As will be understood, this cylindrical surface is easily machined, for example on the lathe, and it is thus possible to obtain an exact dimension therefor regardless of its dimension after casting and heat treating the counter-flanges.

Further features and advantages of the invention will be apparent from the ensuing description with reference to the accompanying drawings to which the invention is in no way limited.

Figure 4:
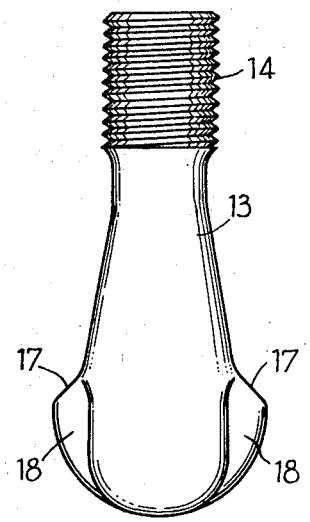

In the drawings:
FIG. 1 is an axial sectional view of a joint according to the invention;
FIG. 2 is a plan view, partly in cross section taken along line 2—2 of FIG. 1 but on an enlarged scale, of a portion of the counter-flange.
FIG. 3 is a perspective view of a bolt, and
FIG. 4 is a rear elevational view of the bolt shown in FIG. 3.

In the illustrated embodiment, the joint is intended to assemble a pipe 1 having a plain male end and a pipe 2 which terminates in a socket whose end includes a recess or inner cavity 4 and an outer flange or ring 5. An annular elastic sealing element 6 located in the recess 4 insures a tight joint. This sealing element is compressed longitudinally by an annular member or counter-flange 7 having substantially U-shaped radial section and open branches 8 and 9. The inner branch 8 is applied against the element 6 so as to compress it and surrounds with a slight clearance the male end of the pipe 1. The outer branch 9 encompasses the outer flange or ring 5 of the socket of the pipe 2.

In accordance with the invention, the inner face of the end of the outer branch 9 of the counter-flange has over a certain length a generally cylindrical surface 10 which is parallel to the axis X—X of the pipe.

Provided on said counter-flange are bosses 11 which are evenly spaced apart on a circumference centered on the axis X—X, these bosses each being provided with an aperture 12 for the passage of a bolt 13. As can be seen in FIG. 2, the circumference of the surface 10 roughly intersects the axes Y—Y of the apertures 12.

Each of the bolts 13 comprises a screw threading 14 on which is screw threadedly engaged a nut 15 which bears against the outer face of the boss of the counter-flange. The head of each bolt includes a hooking nose 16 and two lateral bearing wings or projections 17 which provide on their rear face opposed to the hooking nose bearing faces 18 located in a plane roughly intersecting the axis Y—Y of the bolt.

When the bolt is placed in position, the hooking nose 16 bears against the outer flange 5 of the socket whereas the faces 18 bear against the cylindrical surface 10. In view of the fact that this surface can be easily machined, for example on the lathe, the position of the bolts can be perfectly defined relative to the flange 5 of the socket and the hooking of these bolts can therefore always occur under the same conditions. Further, the presence of said conjugate bearing surfaces 10–18 prevents any undesired rotation of the bolts 13 when tightening the nuts 15.

As mentioned hereinbefore, the advantages of the joint according to the invention are the greater as the nominal diameter of the pipes is greater. Although this type of counter-flange is applicable to pipes of any diameter, it is really only beyond a nominal diameter of about 200 mm. and in respect of all diameters exceeding this nominal diameter that its advantage is noticed to an increasing extent.

Although specific embodiments of the invention have been described, many modifications and changes may be made therein without departing from the scope of the invention as defined in the appended claims.

Having now described my invention what I claim as new and desire to secure by Letters Patent is:

A joint for two coaxial pipe elements one of which has a male end and the other a socket provided with an outer flange, said joint comprising an annular cast counter-flange having an axis coinciding with the axis of said pipe elements and having a generally U-shaped radial section, bosses in spaced relation on the periphery of the counter-flange, apertures in said bosses, the apertures being in spaced relation on a circle centered on said axis of the counter-flange, and joint-assembling bolts extending through the apertures, the counter-flange having an outer branch which has part-cylindrical machined inner surfaces having identical radii which are substantially equal to the radius of said circle and centered on said axis of the counter-flange, each of the bolts comprising a flange-hooking head and two lateral projections which are in the vicinity of the head and located on each side of the head in a hooking nose portion of the head, said lateral projections having faces substantially contained in a common diametral plane of the bolt and facing outwardly of the axis of the counter-flange, said bolts bearing on said part cylindrical inner surface solely by said faces of said two lateral projections.

References Cited by the Examiner

UNITED STATES PATENTS

| | | | |
|---|---|---|---|
| 583,252 | 5/1897 | Dresser | 285—374 X |
| 1,193,483 | 8/1916 | Parker | 285—420 X |
| 2,087,752 | 7/1937 | Carson et al. | 285—368 X |
| 2,108,151 | 2/1938 | Teetor | 285—413 X |
| 2,117,717 | 5/1938 | Harmon | 85—9 |
| 2,657,079 | 10/1953 | David | 285—368 X |

FOREIGN PATENTS 1,157,172    5/1958    France.

CARL W. TOMLIN, *Primary Examiner.*

T. A. LISLE, *Assistant Examiner.*